No. 855,460. PATENTED JUNE 4, 1907.
J. P. JOHNSON.
DRAFT FORCING DEVICE.
APPLICATION FILED MAR. 7, 1906.

Witnesses.
A. H. Opsahl.
E. W. Jeppesen.

Inventor.
John P. Johnson,
By his Attorneys.
Williamson Merchant

UNITED STATES PATENT OFFICE.

JOHN P. JOHNSON, OF STORDEN, MINNESOTA.

DRAFT-FORCING DEVICE.

No. 855,460.  Specification of Letters Patent.  Patented June 4, 1907.

Application filed March 7, 1906. Serial No. 304,742.

*To all whom it may concern:*

Be it known that I, JOHN P. JOHNSON, a citizen of the United States, residing at Storden, in the county of Cottonwood and State of Minnesota, have invented certain new and useful Improvements in Draft-Forcing Devices; and I do hereby declare the following to be a full, clear, and exact description of the invention, such as will enable others skilled in the art to which it appertains to make and use the same.

My present invention has for its object to provide an improved draft forcing device especially adapted for use in connection with threshing machines for producing a forced draft in the stack thereof, and to the above ends the invention consists of the novel devices and combinations of devices hereinafter described and defined in the claims.

The improved draft forcing device is in the nature of a blower which is applied, preferably, to the stack of the engine, and which is adapted to be wound up by the engineer, at some opportune time, and which may be then set in action to produce a forced draft for a considerable length of time.

The device is especially intended for use in starting fires and getting up steam, at which time the engineer or fireman is kept busy, most of the time, putting in fuel, tending to the fire, and doing other work around the engine, so that he could not stand and continuously run a blower or fan for producing the necessary blast.

This improved device involves a power storage motor, preferably a spring motor, which is adapted to be wound up, as before indicated, at a time prior to the starting the fan into action, and at a time when the engineer is not busy with other work. Then, when the forced draft is desired to start the fire, the motor is released and will drive the fan or blower for a long enough time to get up a good fire and get up the desired initial steam pressure, after which the engine will run all right without the blower.

As is well known, threshing engines are universally run by one person, who acts both as engineer and fireman. This improved draft forcing device is especially adapted for use in connection with portable engines which, when standing idle, have no source of initial power for driving the fan or blower of the draft device.

The improved forced draft device is illustrated in the accompanying drawings, wherein like characters indicate like parts throughout the several views.

Figure 1:
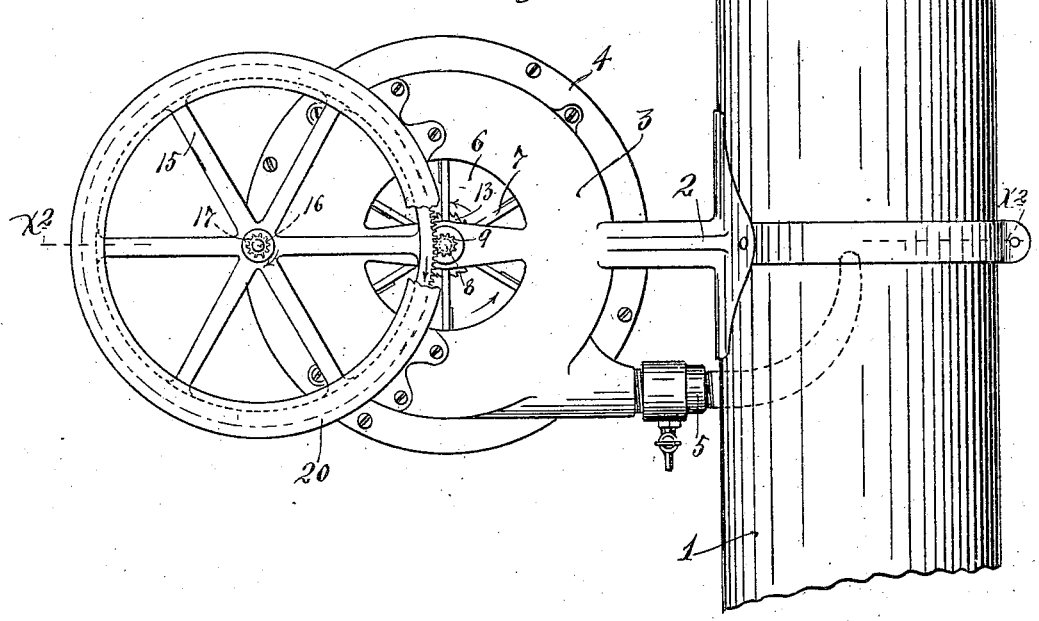
Figure 2:
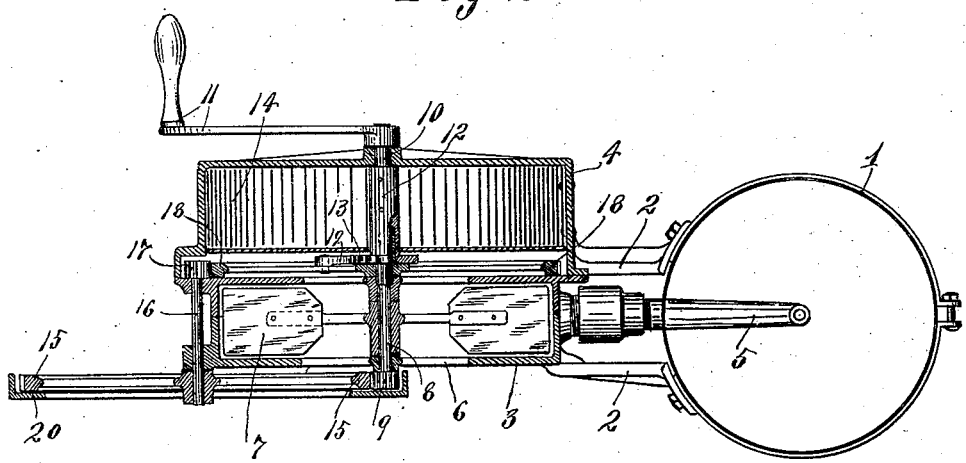

Referring to the drawings, Figure 1 is a view in side elevation, showing a portion of the smoke stack of the threshing machine, or other portable engine, and showing the improved draft forcing device applied to said stack; and Fig. 2 is a horizontal section taken approximately on the line $x^2$ $x^2$ of Fig. 1.

The numeral 1 indicates a stack, to which is rigidly secured, by brackets 2, a combined fan case and spring motor case 3—4. The fan case 3 has a discharge tube 5 that extends into the stack 1, is turned upward therein, and terminates at its open up-turned end at the axis of the said stack. The air is admitted into the fan case through the eyes 6 thereof. An ordinary fan 7 works within the fan case 3 and its shaft 8 projects at one end and is provided with a small spur pinion 9. Extending axially in line with the fan shaft 8, but loose with respect thereto, and mounted in suitable bearings in the case section 4, is a crank shaft 10 which, at its outer end, is provided with an operating crank 11. As shown, a sleeve 12 is rigidly secured on the shaft 10 and this sleeve, at its inner end, is provided with a ratchet wheel 13.

The numeral 14 indicates a heavy motor spring, of the clock spring type which, at its inner end, is attached to the sleeve 12, and at its outer end is attached to the case 4. This spring is wound in such a direction that it tends to drive the sleeve 12 and ratchet wheel 13 in the direction of the arrow marked in the vicinity thereof in Fig. 1.

The pinion 9 on the fan shaft meshes with a large spur gear 15 carried at the outer end of a short countershaft 16, mounted in suitable bearings on the fan case and provided at its inner end with a small spur pinion 17. The spur pinion 17 meshes with a large spur gear 18 that is loosely mounted on the shaft 10 adjacent to the ratchet wheel 13, and is provided with a pawl 19 that engages with the teeth of the ratchet wheel 13 and causes the said ratchet wheel to drive the gear 18 under the force of the motor spring 14. Through the train of gears described, the fan 7 will be driven from the motor spring 14 at a very high rate of speed and in the direction of the arrow marked thereon in Fig. 1. The pawl and ratchet device 13—19 permit the spring 14 to be wound up by the crank 11 without rotation of the fan 7, and the train of gears which drive the same.

The numeral 20 indicates an annular gear casing which, as shown, is secured to the fan case 3 and covers the gear 15 and pinion 9.

The device described, as is evident, is capable of being wound up and then set into action to produce a forced draft for a considerable length of time. The device will ordinarily be constructed to run for about twenty minutes, and this time is usually sufficient to start a good fire and get up steam, but it may, of course, be arranged to run for any desired length of time. The device may be wound up in a very few moments. The device is, therefore, efficient for the purposes had in view. It is also of comparatively small cost and may be applied to the stack of any portable engine without any change whatever, except for a hole that must be provided in the stack for the passage therethrough of the fan discharge tube 5.

What I claim is:

In a draft forcing device, the combined fan case and spring case secured to said stack, said fan case having a discharge tube opening into said stack, a shaft journaled in said combined case, a fan secured to said shaft and working within said fan case, a sleeve loose on said shaft within said spring case, a coiled spring attached at one end to said spring case and at the other end to said sleeve, a driving gear loose on said shaft, a ratchet wheel and pawl connecting said gear to said loose sleeve, and a train of gears connecting said driving gear to the said fan shaft, substantially as described.

In testimony whereof I affix my signature in presence of two witnesses.

JOHN P. JOHNSON.

Witnesses:
 MALIE HOEL,
 F. D. MERCHANT.